(No Model.)
N. PETERSEN.
MACHINE FOR GROOMING ANIMALS.
No. 380,924. Patented Apr. 10, 1888.
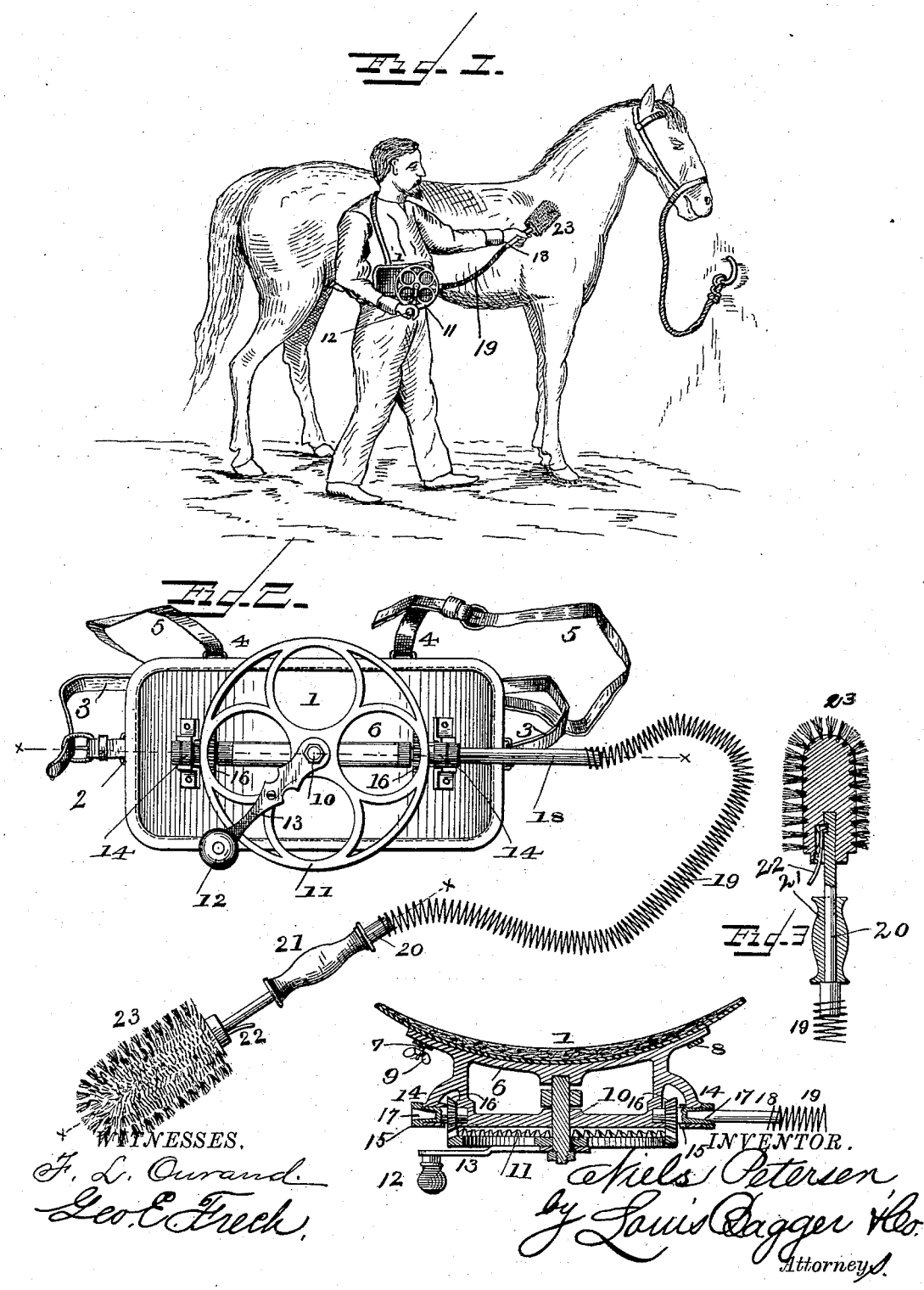

UNITED STATES PATENT OFFICE.

NIELS PETERSEN, OF COPENHAGEN, DENMARK.

MACHINE FOR GROOMING ANIMALS.

SPECIFICATION forming part of Letters Patent No. 380,924, dated April 10, 1888.

Application filed November 21, 1887. Serial No. 255,787. (No model.)

*To all whom it may concern:*

Be it known that I, NIELS PETERSEN, a subject of the King of Denmark, residing at Copenhagen, in the Kingdom of Denmark, have invented certain new and useful Improvements in Machines for Grooming Animals; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1 is a perspective view showing my improved machine for grooming horses and other animals in operation. Fig. 2 is a front view of the same; and Fig. 3 is a horizontal sectional view on line $x$ $x$, Fig. 2, parts being broken away.

The same numerals of reference indicate the same or corresponding parts in all the figures.

My invention has relation to that class of machines for grooming horses and other animals in which a cylindrical brush is revolved by a suitable mechanism connected to the cylindrical brush by a flexible shaft; and it consists in the improved construction and combination of such a machine, which may be secured upon the person grooming the animal, and which will admit of the brush being applied to all parts of the animal with equal ease, as hereinafter more fully described and claimed.

In the accompanying drawings, the numeral 1 indicates a plate or pad, which is provided with suitable eyes, 2, at its ends for the attachment of a belt or straps, 3, which may be buckled around the person using the machine, and the upper edge of the plate or pad is provided with eyes 4, for the attachment of shoulder-straps 5, secured with their rear ends to the rear portion of the belt.

The pad or plate is curved to suit the curve of the body of the person using the machine, and the front side of the plate or pad has a frame, 6, secured to it, the said frame having a corresponding curve, and having one end inserted into a suitable eye or staple, 8, while the other end of the frame is secured by a screw, 7, projecting from the pad through an eye at that end, and having a thumb-nut, 9, for securing the said eye. A bearing, 10, is formed at the middle of this frame, and the shaft of a crown-wheel, 11, is journaled in this bearing, the crown-wheel having a handle and a crank, 12 and 13, secured to its outer face, by means of which it may be revolved. The ends of the frame are formed with outwardly-projecting double bearings 14, standing diametrically opposite and diametrical to the crown-wheel, and two short shafts, 15, are journaled in these bearings, having pinions 16 in the spaces between the double bearings, which pinions mesh with the crown-wheel. The outer ends of the shafts are formed with sockets 17, in which a short shaft, 18, may be secured removably to revolve with the shafts. The outer end of this short shaft is provided with a strong coiled-wire spring, 19, to the outer end of which another shaft, 20, is secured, the said shaft revolving freely within a tubular handle, 21; and a cylindrical brush, 23, may be secured upon the outer end of the shaft by means of a catch, 22.

When the machine is to be used, the short shaft is secured into the socket of whichever shaft will bring the brush into the most convenient position for use, the pad and frame of the machine having in the meantime been adjusted upon the person to use the machine in such a manner that the handle of the crown-wheel will be within easy reach of the right hand, which is used for turning the wheel, while the brush is guided with the left hand. When, now, the wheel is revolved, the socketed shafts will be revolved, and the short shaft within one of the said shafts will be revolved, communicating revolving motion to the brush through the spiral spring forming a flexible shaft or coupling. The revolving brush will now be carried over the body of the animal to be groomed, being preferably worked with the hairs, although at places very full of dirt the brush may be revolved against the hairs.

The revolving brush will clean the animal very thoroughly and without any scratching of the skin, as is liable to happen by the usual curry-comb, the revolving brush creating rather an agreeable sensation upon the skin of the animal, and the whizzing sound of the machine will serve to concentrate the attention of the animal to one point, so that it will pay less attention to the brush passing over the various parts of its body.

The revolving brush can enter places and be used with thorough success at points where no curry-comb or common horse-brush could be used, and as the machine is strapped upon the person applying it, and the short shaft of the flexible coupling is interchangeable in the two sockets, the brush may be easier applied and with less worry to the animal than the revolving brushes which are revolved from a stationary motor, where the animal must be turned to suit the position of the machine or where the machine must be shifted for cleaning the various parts of the body. The machine will in this manner be as handy and convenient as the curry-comb and brush, and will cause the animal less worry and less injury to the skin than the curry-comb, while it will clean the skin more thoroughly than the best grooming with curry-comb and brush can produce and in a shorter space of time.

The brush may be cleaned by simply running it against a wall or against the edge of a board, and the machine is so simple of construction that it may be manufactured at a comparatively low cost, and will not be liable to be injured or get out of order by even unskillful handling.

Having thus described my invention, I claim and desire to secure by Letters Patent of the United States—

1. In a machine for grooming animals, the combination of a frame adapted to be strapped or otherwise secured to a person's body, two shafts at opposite ends of the frame, having socketed outer ends and provided with pinions upon their inner ends, a crown-wheel journaled in bearings in said frame and meshing with said pinions, whereby the shafts are revolved in opposite directions, and a flexible shaft or coupling having a cylindrical brush at one end and a short shaft at the other adapted to fit removably in either socket of the shafts, substantially as described.

2. In a machine for grooming animals, the combination of a pad or plate having eyes for the attachment of straps for securing it to the body of the person using the machine, a frame secured removably to the pad and having a central bearing and two pairs of diametrically-opposite bearings diametrical to the central bearing, a crown-wheel having its shaft journaled in the central bearing and having a handle for revolving it, shafts journaled in the opposite bearings and having pinions engaging the crown-wheel between the bearings of each pair of bearings, a short shaft fitting with one end in a socket in the outer ends of the shafts and having a flexible shaft or coupling secured to its outer end provided with a shaft at its outer end formed with a suitable catch, a handle having the shaft at the outer end of the flexible coupling journaled within it, and a cylindrical brush having a socket at its end for fitting securely upon the outer shaft portion and having a suitable catch for the engagement of the catch of the said shaft portion, as shown and described.

3. In a machine for grooming animals, the combination of a curved pad or plate provided with eyes in its side edges and in its upper edge, shoulder-straps secured at their lower ends to the back of the said pad and at their upper ends to the eyes of the upper edge of the pad, and a belt secured at its ends to the eyes in the side edges of the pad, whereby the said pad is adapted to be secured to the body of the person using the machine, bearings secured to said pad, two shafts journaled in said bearings and having socketed outer ends and provided with pinions on their inner ends, a crown-wheel journaled in suitable bearings and meshing with said pinions, whereby the shafts are revolved in opposite directions, and a flexible shaft having a brush at one end and a short shaft at the other adapted to fit removably in either of the sockets of the shafts, substantially as described.

In testimony whereof I have hereto affixed my signature in presence of two witnesses.

NIELS PETERSEN.

Witnesses:
S. CHELKON,
VIGGO C. ECHERTT.